Aug. 20, 1963    N. V. FRYE    3,101,071
ANIMAL WATERER
Filed March 13, 1962    2 Sheets-Sheet 1

INVENTOR.
N. V. FRYE

BY
ATTORNEY

Aug. 20, 1963       N. V. FRYE                3,101,071
                  ANIMAL WATERER
Filed March 13, 1962                    2 Sheets-Sheet 2
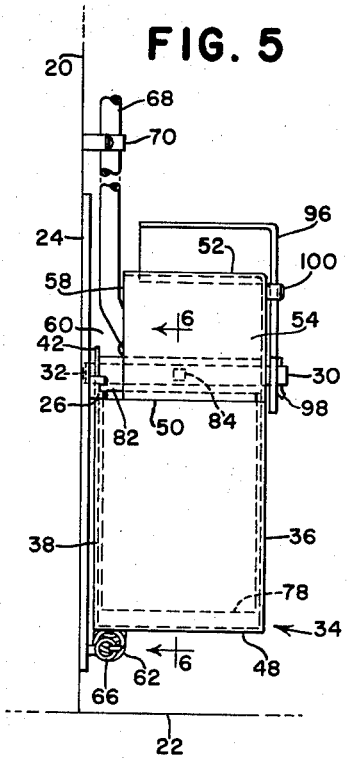
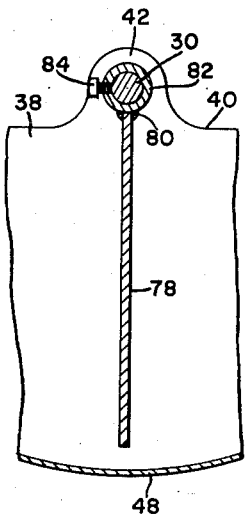
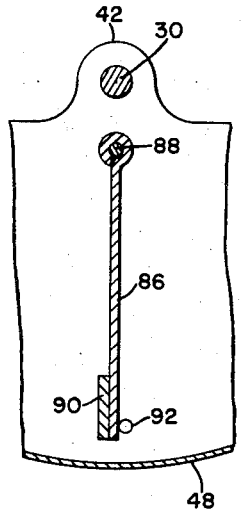
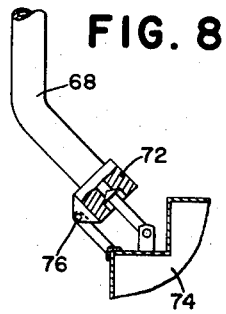
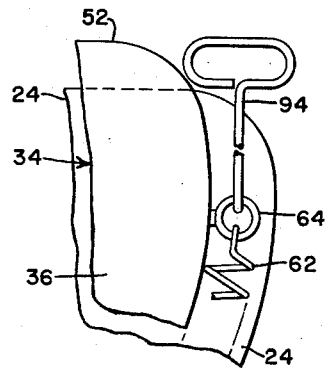
INVENTOR.
N. V. FRYE
BY
ATTORNEY United States Patent Office 3,101,071
Patented Aug. 20, 1963

3,101,071
ANIMAL WATERER
Norman V. Frye, Rte. 4, Davenport, Iowa
Filed Mar. 13, 1962, Ser. No. 179,396
11 Claims. (Cl. 119—78)

This invention relates to an animal waterer and more particularly to novel improvements in the design and construction thereof.

Animal waterers of the general class referred to are used in barns, pens and other quarters in which domestic animals, in particular, are confined, and most if not all of these waterers operate on the principle that they are automatically fed by float-controlled water lines so that the containers may be kept filled with little or no attention other than occasional cleaning and other maintenance. In the case of hogs or other animals of like size, such waterers are placed at a relatively low level and consequently present problems in use and maintenance. For example, they must be sturdily constructed to withstand heavy usage. They must be convenient to attend to, and above all must be economical as to both initial cost and long service life.

According to the present invention, the principal object is to provide a new and improved waterer which may be readily installed in typical animal quarters. It is a further object to provide a waterer which may be manually controlled as between normal and dumped positions, thereby facilitating cleaning of the waterer to wash out therefrom accumulated feed and other foreign material. It is a further object to provide a waterer which may be controlled by either a pedal or a handle, thereby enabling operation thereof by the farmer as he walks through the pen or even as he reaches over the wall from the outside the pen. A still further object resides in the design in which the waterer is generally compartmented to provide a first compartment for animal access and another compartment which contains the float, together with wall structure which protects the float from damage by the animal. A still further object resides in the design and construction whereby the container may be readily mounted and dismounted. And yet another object is the provision of partition means between the two compartments of the container which functions as an aid in cleaning the container.

The foregoing and other important objects and desirable features inherent in and encompassed by the invention will become apparent as the preferred embodiment thereof is disclosed in detail in the ensuing description and accompanying sheets of drawings, the figures of which are described below.

FIGURE 5 is an end view, drawn to the scale of FIGURES 1 and 2.

FIGURE 6 is an enlarged fragmentary section, as seen generally on the line 6—6 of FIGURE 5, showing one form of partition means.

FIGURE 7 is a similar view showing a modified form of partition means.

FIGURE 8 is an enlarged section, as seen generally along the line 8—8 of FIGURE 1, illustrating the relationship between the inlet or supply pipe, float and float valve.

FIGURE 9 is a fragmentary elevation illustrating how the waterer may be operated remotely by a handle.

For present purposes, the waterer may be regarded as being designed for use in pens or other enclosures and located at a relatively low level for use by animals such as hogs, pigs etc. In FIGURE 5, such pen structure is shown typically as including a wall 20 and a floor 22.

Figure 2:
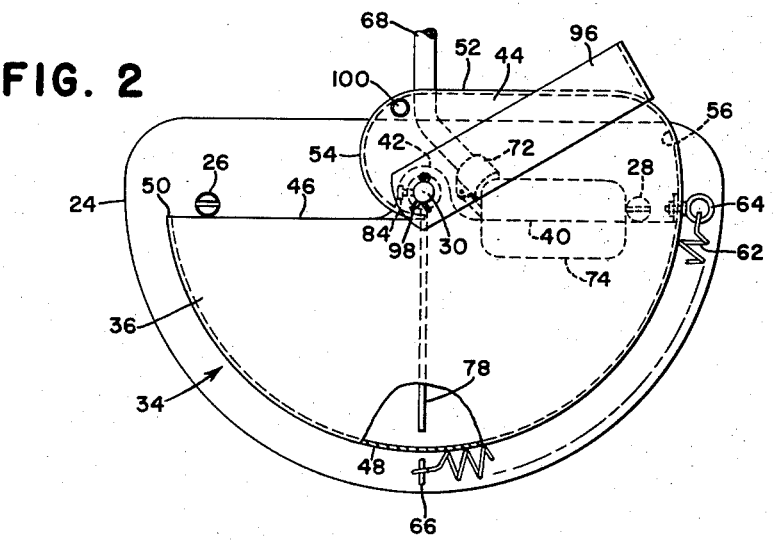
FIGURE 2 is an elevation of the same.

The waterer may be provided as a compact unit, furnished with sufficient parts to enable the unit mounting thereof on such support structure as the wall 20, for example; although, it will be obvious that the waterer could be otherwise mounted or could be mounted on different types of support. Therefore, the present disclosure should be taken as representative and not limiting. The basic attachments may take the form of a generally semicircular steel plate 24, having means for the rigid affixation thereof to the wall 20, such means in the present case taking the form of a pair of screws 26 and 28, the former of which has an enlarged head so as to be capable of functioning as a stop, for purposes to presently appear. For purposes of convenience and orientation, the waterer will be regarded as being viewed from front to rear as seen in FIGURE 2; that is, an observer standing in front of the waterer will be facing the wall 20.

Rigidly associated with the back plate or support 24 is a pivot member of shaft 30. In this case, the rear or wall-proximate end of the shaft 30 is threaded into a tapped hole, as at 32, in the plate 24 so that the shaft projects outwardly or forwardly in a horizontal position.

The other basic component of the waterer, considering the support 24—30 as one component, is a container, designated in its entirety by the numeral 34. This container is carried by the shaft 30 for rocking from its normal or central position shown in FIGURE 2 to either side of said position to a flushing or dumping position (FIGURE 3) or an assembly or disassembly position (FIGURE 4). The container has front and rear walls 36 and 38, respectively, the latter of which is generally of semicircular configuration, in this case having an upper diametrical marginal edge 40, which is shaped in this case to afford an ear 42 as representative of the construction by which the mounting of the container on the shaft 30 is effected. The front wall 36 is of larger area than the rear wall, having an upper portion 44 to the upper right of center as seen in FIGURE 2 and further having a radial marginal edge 46. When the container is in its normal or central position, the edges 40 and 46 are horizontal; although, this is not a limitation on the invention.

The container structure as such is completed by a partly annular wall 48 which provides a bottom for the container. This bottom may be regarded as starting at a marginal edge 50 which lies at the same level as the marginal edge 46 of the front wall 36 and the forward part of the marginal edge 40 of the rear wall 38, the bottom wall extending thence semicircularly to the opposite side of center and thence upwardly and back to the left as a roof or cover 52, curving thence downwardly and back toward the center to afford a protective wall 54.

The construction as thus far described lends itself readily to the production thereof from relatively heavy gage sheet metal; although, here again this does not limit the applicability of the invention. The bottom wall 48 is rigidly joined to the walls 36 and 38 and continues in its configuration at 52—54 as described and, since the rear wall 38 terminates at the aforesaid upper marginal edge 40, this edge, to the right-hand side of center as seen in FIGURE 2 (to the left as seen in FIGURE 4) combines with the roof to provide a rearwardly facing opening 56. Further, the roof 52 terminates at its rear or inner marginal edge at 58 short of the vertical plane of a continuation of the wall 38 so as to establish therein an elongated slot 60.

The container 34 is influenced to its normal or central position by action of biasing means and a stop. The stop is established by the enlarged head of the screw 26, which extends outwardly from the back plate 24 to be abutted from below by the forward part of the top marginal edge 46 of the rear wall 38. A coiled tension spring 62 is connected at one end to an eye 64 and at its other end to an eye 66, the eye 64 being carried by the container and the eye 66 being carried by the back plate 24, and the spring 62 extends arcuately about part of the container as shown in FIGURE 2.

In this position, the container is adapted to contain water at a predetermined level normally slightly below the plane of the top edges 40 and 46 of the walls 38 and 36. The container is connected to a source of water supply, here represented by a pipe or conduit 68 which may be rigidly attached to the wall 20, as suggested at 70 in FIGURE 5. The lower end of the conduit is directed inwardly and to the right as seen in FIGURE 2 and has at its lower end a combination fitting and valve 72 (FIGURE 8) which may be of any suitable construction, that illustrated being merely representative. The valve in turn is connected to a float 74 which is typically hinged, as at 76, to the fitting 72. Water is constantly available at the outlet end of the pipe 68 but the float of course shuts off this water when the level in the container reaches its predetermined mark.

As will be seen, the overall dimensions of the float 40 are smaller than those of the back opening 56, which enables the float to pass through the opening 56 in assembly and disassembly of the container as respects the mounting shaft 30. Another significant feature of the invention is the provision of the slot 60, which establishes clearance for the pipe 68 as the container rocks from the position of FIGURE 2 to that of FIGURE 3. The same clearance is available when the container is rocked in the opposite direction as shown in FIGURE 4. As shown in that figure, the purpose of the register between the float 40 and the opening 56 is to enable mounting and dismounting of the container, which will be covered subsequently.

Figure 1:
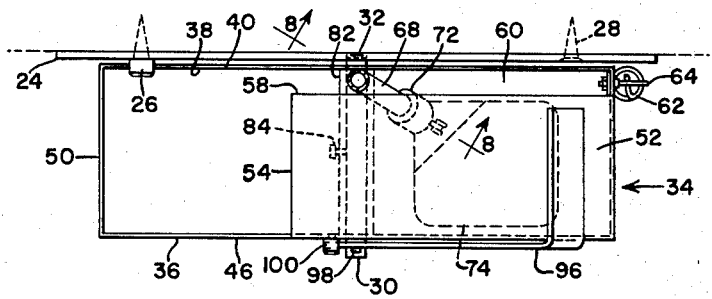
FIGURE 1 is a plan view of the waterer as embodied in a preferred design.

Since the portion of the container to the right of center as seen in FIGURES 1 and 2 is substantially covered, at least from the front and top by the associated wall portions, particularly the roof 52 and wall 54, the portion to the left of center is open at its top for animal access. At the same time, the wall structure 52—54 affords protection to the float so that it cannot be damaged by the animal.

A further partitioning effect, as well as further protection for the float 74 is afforded by a depending partition wall 78, which in FIGURES 1 through 6 is shown as being welded at its upper end at 80 to a sleeve 82 which slips over the shaft 30 intermediate the container walls 36 and 38. Means, such as a cap screw 84, may be used to secure the partition 78 in its depending position and thus fixing it against rotation, since it is fixed to the shaft and the shaft is fixed to the back plate 24. Thus, when the container is tilted or dumped to its FIGURE 3 position, the wall 78 remains stationary. This wall has a limited clearance at its lower marginal edge with the interior surface of the semicircular bottom 48 so that as the container is tipped from the FIGURE 2 position to the FIGURE 3 position, the lower marginal edge of the wall 73 is effective to scrape from the container any accumulated feed and other foreign matter that may have settled therein. Another result of fixing the partition 78 to the shaft 30 is that it cannot be swung rearwardly by the animal.

A modified form of partition is shown in FIGURE 7, the depending plate in this case being indicated by the numeral 86 and as depending from a cross shaft 88 parallel to and just below the main shaft 30. The lower end of the partition 86 may be weighted at 90 to cause it to assume its depending position. A stop 92 is provided in the container rearwardly of the wall 86 so as to prevent rearward swinging thereof. One advantage of this partition is that it may be manually moved forwardly to provide access to the container at the opposite side thereof. However, in the construction of FIGURE 6, the set screw 84 could be loosened to perform the same function.

FIGURE 9 illustrates a construction in which the container may be manually tipped by reaching same with an elongated handle or rod 94, the lower end of which may be hooked to be received by the upper eye 64. A construction of this nature is advantageous for the operator from the standpoint that it enables him to reach over the wall of the pen or other enclosure so as to dump or flush the container.

Figure 3:
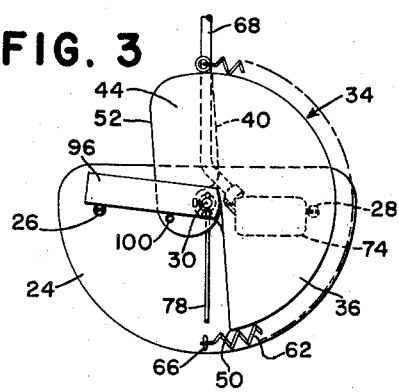
FIGURE 3 is a view, on a small scale, showing the waterer tipped to a flushing or dumping position.
Figure 4:
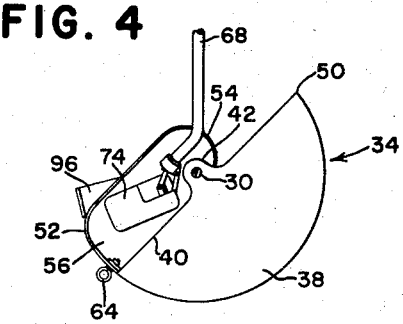
FIGURE 4 is a view, drawn to the scale of FIGURE 3, and showing the waterer as viewed from the other side and illustrating one phase of the mounting or removal thereof.

FIGURES 1 through 5 show a pedal-operated construction, in which a pedal in the form of an L-shaped arm 96 is pivotally carried by the forward or free end of the shaft 30, being retained by a cotter 98. The pedal is free to turn within limits on the shaft 30 and in a storage or idle position assumes the status of FIGURES 1 and 2, wherein its radius, being different from that of the associated portion of the container 34, causes it to rest at the upper right-hand portion of the container. The user, with his toe, may swing the pedal upwardly and forwardly so that its front edge engages a stop 100, and further movement of the pedal will pick up the container and cause it to turn to its position of FIGURE 3 provided the force is still maintained thereon. One advantage of the storage position of the pedal is that it does not stand up in an upright position and thus will not interfere with the passage of animals walking close by. Also, it will not attract the animals to rub against it. When the pedal is swung up to the position in which it engages the stop 100, it is still over-center to the right, so that if the operator removes his foot, the pedal will return to the storage position.

When the container is assembled on the shaft 30, the partition 78 is confined between the walls 36 and 38. The pedal is mounted on the outer end of the shaft by the cotter pin 98. When the water is at the predetermined level, the float 74 occupies the position of FIGURE 2 and is therefore out of register with the opening 56. The container is limited by the stop 26 and the spring 62 holds it in its normal position.

Should it be desired to remove the container from the shaft 30, the cotter pin 98 is removed so that the pedal may be taken off. The cap screw 84, which secures the partition 78 to the shaft 30, is loosened, which enables the entire container to be shifted forwardly, whereupon the container inner wall 38 clears the stop 26, so that the container may be rocked in a clockwise direction as seen in FIGURE 2, which is the same direction in which the spring 62 is acting. To facilitate this phase of removal, the spring 62 could be removed initially. At any rate, when the container turns to the position of FIGURE 4, water having been previously emptied therefrom, the float and opening 56 may be registered so that continued forward movement of the container clears it from the float, leaving the back plate 24, shaft 30, pipe 68 and float in place. Installation will involve merely a reversal of the foregoing.

In the case of the partition illustrated in FIGURE 7, the container is removed in the same manner, but the partition 86 remains with the container rather than sliding off of the shaft at the same time as does the sleeve-mounted partition 78.

It will therefore be seen that the structure of the invention is of simple sturdy design, lending itself readily to mass-production methods so that it may be economically furnished. Because of the simplicity of the construction, it will have a long service life. Operation and maintenance thereof are easy, and same may be controlled in either of the two ways illustrated.

Features and advantages other than those enumerated will readily occur to those versed in the art, as will many modifications and alterations in the preferred embodiments illustrated, all of which may be achieved without departure from the spirit and scope of the invention.

What is claimed is:

1. An animal waterer, comprising: a horizontal shaft having front and rear ends and including means at its rear end for the mounting thereof on and to project forwardly from a support; a container carried by the shaft for forward axial removal therefrom and for rocking to dump and release positions at opposite sides of a central position, said container having front and rear walls respectively adjacent to the front and rear ends of the shaft and radial to the shaft axis and having major portions thereof below said axis, and said container having a bottom joined to and generally coextensive with said major portions to define first and second container parts respectively at diametrically opposite sides of the shaft, said first part having an open top for animal access to water therein in the central position of the container and said bottom being so shaped in said first part that when the container is rocked in the direction causing the first part to move down and the second part up it achieves said dump position and water is discharged therefrom, said rear wall having an upper marginal edge bordering said second part and said container having roof means overlying said second part and spaced both above and forwardly of said rear wall edge to provide respectively a rear opening and an upper slot radial to the shaft; means for connecting the container to a source of water supply, including a conduit entering the second part via said opening and closely adjacent to the shaft, a float within the second part and dimensioned to pass through said opening, and means connecting the float to the inlet to normally maintain a water level in the container below said marginal edge, said slot being dimensioned to accommodate the conduit when the container is rocked to its dump position and said float, in the central position of the container, being normally downwardly out of register with said rear opening; stop means engaging the container and normally confining rocking thereof between its central and dump position, said stop means being disengageable from the container upon forward movement thereof on the shaft to enable rocking of said container in the opposite direction to its release position for achieving register between the float and said rear opening whereby the container is completely forwardly removable from the shaft relative to the shaft, conduit and float; means releasably holding the container against forward movement on the shaft; means biasing the container to its central position and into engagement with the stop; and means on the container for receiving a rocking force for movement thereof to said dump position.

2. An animal waterer, comprising: a horizontal shaft having front and rear ends and including means at its rear end for the mounting thereof on and to project forwardly from a support; a container carried by the shaft for rocking between normal and dump positions, said container having front and rear walls respectively adjacent to the front and rear ends of the shaft and radial to the shaft axis and having major portions thereof below said axis, and said container having a bottom joined to and generally coextensive with said major portions to define first and second container parts respectively at diametrically opposite sides of the shaft, said first part having an open top for animal access to water therein in the normal position of the container and said bottom being so shaped in said first part that when the container is rocked in the direction causing the first part to move down and the second part up it achieves said dump position and water is discharged therefrom, said rear wall having an upper marginal edge bordering said second part and said container having roof means overlying said second part and spaced forwardly of said rear wall edge to provide an upper slot radial to the shaft; means for connecting the container to a source of water supply, including a conduit entering the second part forwardly over said edge and closely adjacent to the shaft, a float within the second part, and means connecting the float to the conduit to normally maintain a water level in the container below said marginal edge, said slot being dimensioned to accommodate the conduit when the container is rocked to its dump position; stop means engaging the container and confining rocking thereof between its normal and dump positions; means biasing the container to its normal position and into engagement with the stop; and means on the container for receiving a rocking force for movement thereof to said dump position.

3. The invention defined in claim 2, including: a partition between the first and second container parts and in radially depending relation to the shaft and having a lower edge proximate to the container bottom; means mounting the partition in the container to retain its depending relation during rocking of the container to its dump position; and said bottom being so shaped as to cooperate with the lower edge of the partition in a wiping relation as the container is rocked to said dump position.

4. The invention defined in claim 3, in which: the shaft is fixed against rotation and the mounting means includes a direct connection fixing the partition to the shaft.

5. The invention defined in claim 4, in which: said connection is releasable to enable separation of the partition from the shaft and serves as the aforesaid means for holding the container on the shaft.

6. The invention defined in claim 2, including: a partition between the first and second container parts and in radially depending relation to the shaft and having a lower edge proximate to the container bottom; means extending across the container walls separate from but closely proximate to the shaft and suspending the partition in said depending relation; means acting on the partition to cause it to retain its depending relation during rocking of the container to its dump position; and said bottom being so shaped as to cooperate with the lower edge of the partition in a wiping relation as the container is rocker to said dump position.

7. An animal waterer, comprising: a horizontal shaft having front and rear ends and including means at its rear end for the mounting thereof on and to project forwardly from a support; a container carried by the shaft for rocking between normal and dump positions; means biasing the container to its normal position; pedal means for rocking the container to its dump position, including a member having an arm pivotally mounted on the shaft for swinging relative to the container between a storage position and an operating position, said arm in its storage position extending radially from the shaft in the direction opposite to the direction of rocking of the container to its dump position and being swingable thence in the direction of rocking of the container to dump position to assume said operating position in which it extends generally radially upwardly beyond the container; and stop means on the container engageable by the arm when it reaches its operating position for transmitting force to the container to rock the container to its dump position.

8. An animal waterer, comprising: a horizontal shaft having front and rear ends and including means at its rear end for the mounting thereof on and to project forwardly from a support; a container carried by the shaft for rocking between normal and dump positions; means biasing the container to its normal position; means operative to overcome the biasing means for rocking the container to its dump position; and means mounting the rocking means on the container for movement of said rocking means relative to the container between storage and operating positions while the container is in its normal position.

9. An animal waterer, comprising: a horizontal shaft having front and rear ends and including means at its rear end for the mounting thereof on and to project forwardly from a support; a container carried by the shaft for rocking between normal and dump positions; means biasing the container to its normal position; control means operative to overcome the biasing means for rocking the container to its dump position; and means mounting the control means on the container for movement of said control means relative to the container between storage and operating positions while the container is in its normal position.

10. An animal waterer, comprising: a horizontal shaft having front and rear ends and including means at one end for the mounting thereof on and to project from a support; a container carried by the shaft for rocking between normal and dump positions, said container having wall and bottom means disposed primarily below the shaft axis and defining first and second container parts respectively at diametrically opposite sides of the shaft, said first part having an open top for animal access to water therein in the normal position of the container and said bottom means being so shaped in at least said first part that when the container is rocked to its dump position the first part is lowered and the second part is raised to discharge water from said container, and said container having roof means overlying said second part and so related to the wall means at one end of the shaft as to provide an opening above the shaft axis; means for connecting the container to a source of water supply, including a conduit entering the second part via said opening, a float within the second part, and means connecting the float to the conduit to normally maintain a predetermined water level in said container, said opening being shaped and dimensioned to accommodate the conduit when the container is rocked between dumped and normal positions; means biasing the container to its normal position; stop means limiting biasing of the container to said normal position; and means on the container for receiving a rocking force for movement of said container to its said dump position.

11. The invention defined in claim 10, including: partition means between the first and second parts and in depending relation to the shaft means and having a lower edge in proximate, scraping relation to the bottom means when the container is rocked to perform a wiping action on said bottom means, said bottom means being cooperatively shaped relative to said lower edge.

References Cited in the file of this patent

UNITED STATES PATENTS

| | | |
|---|---|---|
| 1,154,768 | Herold | Sept. 28, 1915 |
| 1,322,682 | Erickson | Nov. 25, 1919 |
| 1,854,117 | Devitt | Apr. 12, 1932 |